Oct. 10, 1961     D. G. PETERSON     3,003,718

ENGINE MOUNT FOR AIRCRAFT

Filed Jan. 19, 1959

INVENTOR.
David G. Peterson
BY
ATTORNEY C. McKnight

United States Patent Office 3,003,718
Patented Oct. 10, 1961

3,003,718
ENGINE MOUNT FOR AIRCRAFT
David G. Peterson, P.O. Box 2355, Oakland, Calif.
Filed Jan. 19, 1959, Ser. No. 787,658
5 Claims. (Cl. 244—54)

This invention relates to an engine mounting structure, and more particularly, but not by way of limitation, to an engine mount structure for facilitating the mounting of an extremely thin engine on an aircraft wing.

In a multi-engine aircraft wherein the engines are mounted on the wings thereof, it is desirable to provide an engine and engine nacelle structure of a minimum depth in order to reduce the drag on the aircraft. The present invention contemplates a novel mounting structure for securing the thin engine to the wing in a manner for providing maximum strength and rigidity therefor. The novel mounting structure comprises a cross beam secured between the front and rear spar members of the wing for distributing the load and stabilizing the spar members to carry the load more efficiently. The mounting structure is provided with a triangular box disposed in a cut out portion at the leading edge of the wing in a manner to maintain the strength of the wing through the cut out portion and provide a stabilization therefor under the stresses during load conditions.

Further, the novel mounting structure provides a maximum strength for a given weight in that the structural material thereof is at the extreme outer surface of the wing, making the cross beam of a maximum thickness. Additional compression strength is provided between the spars of the wing structure which strengthens the wing at a critical point. The structural loads, such as shear, bending and torsion are transmitted into the main wing structure and the leading edge of the triangular or torsion box. The novel mounting structure provides a superior structure to be added to the existing wing structure without a major wing disassembly or modification. The outboard torsion loads from the leading edge of the wing are carried back to the aircraft fuselage in the most efficient manner possible. In addition, the torque loads during the landing of the aircraft caused by the downward inertia of the engine are carried back to the fuselage in the most efficient manner by the utilization of the torque box at the leading edge of the wing in cooperation with the front and rear spar members of the wing.

It is an important object of this invention to provide an engine mounting structure for facilitating the mounting of an engine on the wing of an aircraft.

It is another object of this invention to provide an engine mounting structure wherein the structural members thereof may be of a maximum thickness in order to provide maximum strength for a given weight.

Another object of this invention is to provide an improved engine mounting structure wherein additional compression strength is gained at the most critical point of the aircraft wing.

Still another object of this invention is to provide an improved engine mounting structure wherein shear loads, bending moments and torsions are properly transmitted into the main wing structure.

A further object of this invention is to provide an engine mount wherein modification of the existing wing structure is maintained at a minimum.

A still further object of this invention is to provide an engine mount wherein torque loads upon landing of the aircraft are transmitted to the fuselage in the most efficient manner.

Another object of this invention is to provide an improved engine mounting structure which is simple and efficient in operation and economical and durable in construction.

Other objects and advantages of the invention will be evident from the following detailed description, read in conjunction with the accompanying drawings, which illustrate my invention.

Figure 1:
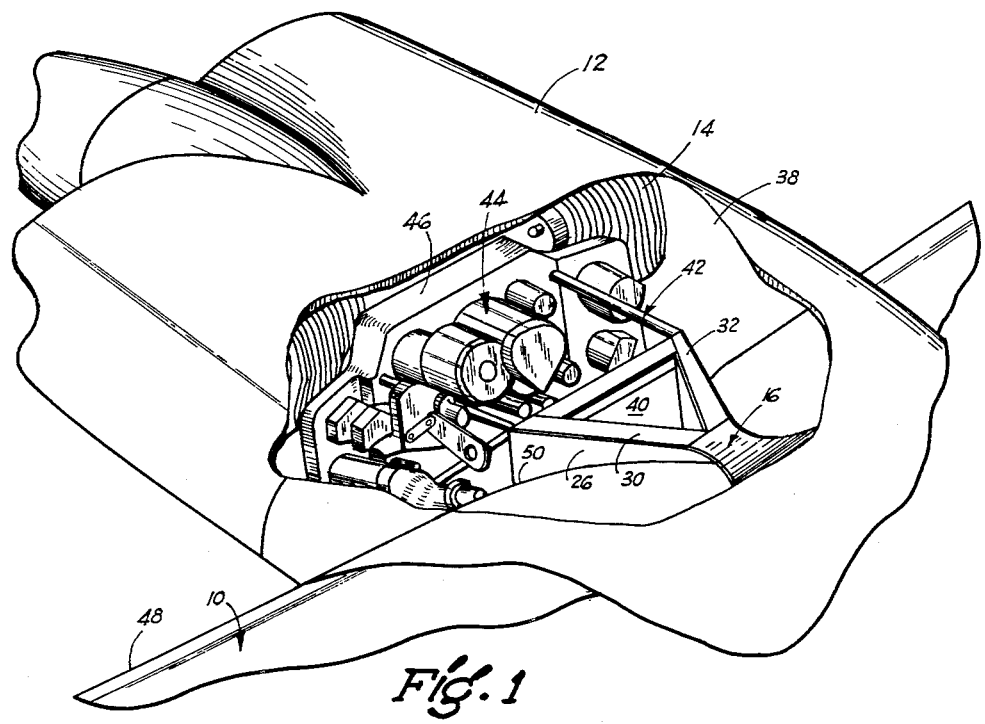
FIGURE 1 is a perspective view of a portion of an aircraft wing and engine structure having a portion thereof cut away for purposes of illustration.

Referring to the drawings in detail, reference character 10 indicates in general the wing of an aircraft (not shown) and having an engine nacelle structure 12 mounted thereon. A suitable engine 14, preferably of a horizontal opposed type, but not limited thereto, is encased within the engine nacelle 12, as is well known. The engine 14 is mounted on the wing 10 by an engine mounting structure, generally indicated at 16, in a manner as will be hereinafter set forth.

Figure 2:
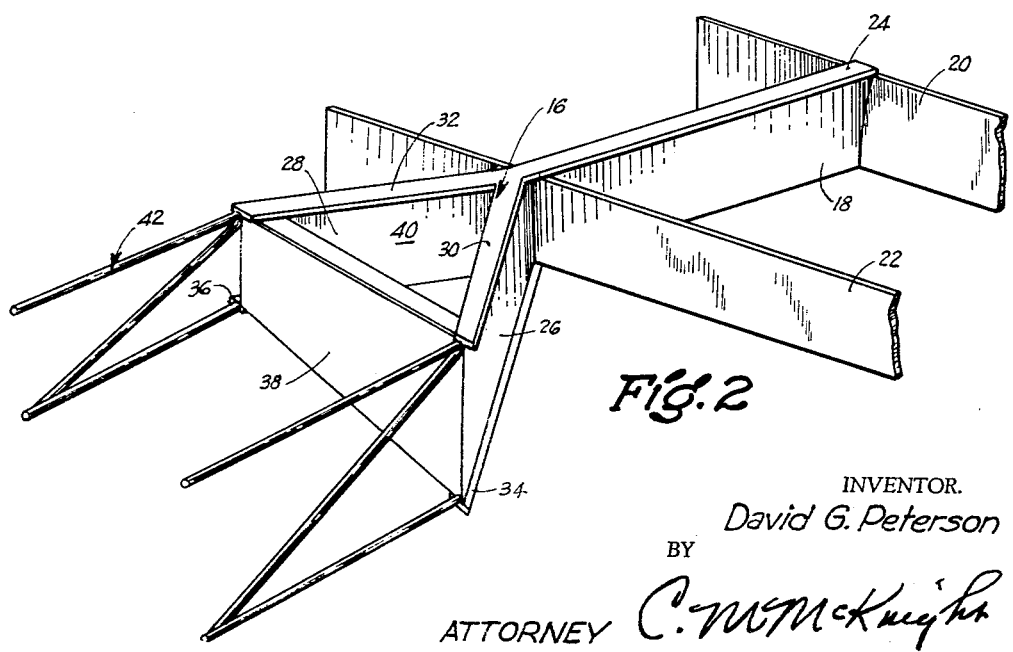
FIGURE 2 is a perspective view of an engine mounting structure embodying the invention.

The engine mounting structure 16 comprises a cross beam member 18 rigidly secured in any well known manner (not shown) between the rear spar member 20 and the front spar member 22 normally provided in the wing 10. The cross beam member 18 is strengthened by a top cap member 24 which is suitably secured thereto, or may be integral therewith. A pair of diverging beam members or legs 26 and 28 are suitably secured to the front spar 22 at the juncture of the cross beam 18 and extend forwardly from the front spar 22 as clearly shown in FIG. 2. The beam members 26 and 28 are provided with top cap members 30 and 32, respectively, for strengthening thereof. Similar bottom cap members 34 and 36, respectively, may be provided for the legs 26 and 28 for an additional strengthening thereof.

A transverse beam or leg member 38 is provided at the forward extremity of the angularly disposed leg members 26 and 28 and is rigidly secured therebetween in any well known manner (not shown) to provide a triangular shaped torsion box portion 40. Any suitable engine mount structure, such as the tubular members generally indicated at 42, may be rigidly secured to the transverse leg 38 and extends forwardly therefrom for receiving the engine 14 in any well known manner, as clearly shown in FIG. 1.

It will be noted in FIG. 1 that the engine accessory group, generally indicated at 44, is preferably mounted on an engine accessory case 46 which is secured to the rear portion of the engine 14. It has been found that this arrangement of the engine accessories 44 provides for a minimum overall depth of the engine 14 and nacelle structure 12, as has been set forth in my co-pending application entitled "Engine Accessory Case," Serial No. 787,476, filed January 19, 1959.

Operation

When it is desired to mount the engine 14 on the wing 10, the leading edge 48 of the wing is cut away at the point where it is desired to mount the engine to provide a triangular shaped portion 50 (FIG. 1). The triangular shaped cut-away portion 50 is substantially the same configuration of the torsion box 40 for receiving the torsion box therein. The torsion box is bolted, riveted or otherwise suitably secured to the front spar 22 at the juncture of the cross beam 18, as hereinbefore set forth. The cross beam 18 extends between the front spar 22 and the rear spar 20, and is suitably bolted or riveted therebetween. Thus, it will be apparent that a minimum of alteration to the wing structure is required for installing the engine mounting structure 16.

The triangular shape of the torsion box 40 provides a rigidity and strength for the wing 10 at the most critical point of the wing structure with respect to the engine mounted thereon. The structural loads, such as the shear, bending and torsions, are transmitted through the torsion box and the cross beam 18 for distribution to the front and rear wing spars. In addition, the landing torque loads of the aircraft is carried back to the fuselage in the most efficient manner by utilizing the torsion box at the leading edge of the wing structure.

From the foregoing, it will be apparent that the present invention provides a novel engine mount particularly designed and constructed to strengthen and stabilize the wing structure of an aircraft at the most critical point with respect to the engines mounted on the wing. The novel engine mounting structure provides a torsion box portion at the leading edge of the wing for cooperating with a cross beam member to facilitate the distribution of the structural loads and landing loads throughout the wing spar structure and to the fuselage of the aircraft in the most efficient manner possible. In addition, the engine mounting structure is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In combination with an aircraft wing structure having front and rear spar members, an engine mount comprising a cross beam rigidly secured between the front and rear spar members, a triangular shaped torsion box rigidly secured to the front spar member at the juncture of the cross beam and disposed within the wing structure for strengthening thereof, a top cap member provided on the cross beam and the torsion box for strengthening thereof, and means for securing the engine to the forward portion of the torsion box.

2. An engine mount adapted to be secured to the spar members of an aircraft wing, and comprising a cross beam rigidly secured between said spar members, a triangular shaped torsion box rigidly secured to one of said spar members at the juncture of the cross beam and disposed within the wing structure for strengthening thereof, a top cap member provided on the cross beam and the torsion box for strengthening thereof, and means for securing the engine to the forward portion of the torsion box.

3. An engine mount adapted to be secured between the spar members of an aircraft wing, and comprising a cross beam rigidly secured between said spar members, a torsion box rigidly secured to one of said spar members at the juncture of the cross beam and disposed within the wing structure, said torsion box having diverging leg members to provide a triangular configuration therefor, and means for securing the engine to the forward portion of the torsion box.

4. In combination with an aircraft wing structure having front and rear spar members, an engine mount comprising a cross beam rigidly secured between the front and rear spar members, a pair of diverging leg members secured to the front spar at the juncture of the cross member and extending forwardly therefrom, a transverse leg member secured between the diverging leg members at the outer extremity thereof to provide a triangular shaped torsion box disposed within the wing for strengthening thereof, and means for securing the engine to the transverse leg member.

5. In combination with an aircraft wing structure having front and rear spar members, an engine mount comprising a cross beam rigidly secured between the front and rear spar members, a top cap member provided on the cross beam for strengthening thereof, a pair of angularly disposed leg members secured to the front spar member at the juncture of the cross beam, upper and lower cap members provided on each of the leg members for strengthening thereof, a transverse leg member secured between the angularly disposed leg members at the outer extremity thereof to provide a triangular shaped torsion box disposed within the wing for strengthening thereof, and means extending forwardly from the transverse leg member for securing the engine thereto.

References Cited in the file of this patent
UNITED STATES PATENTS

| | | |
|---|---|---|
| 1,782,013 | Rohrbach | Nov. 18, 1930 |
| 2,119,181 | Saulnier | May 31, 1938 |

FOREIGN PATENTS

| | | |
|---|---|---|
| 143,896 | Great Britain | Jan. 13, 1921 |
| 507,681 | Great Britain | June 20, 1939 |